United States Patent
Shin et al.

(10) Patent No.: US 10,715,372 B2
(45) Date of Patent: Jul. 14, 2020

(54) METHOD FOR OBTAINING INFORMATION ABOUT CYCLIC PREFIX IN WIRELESS COMMUNICATION SYSTEM AND DEVICE FOR SAME

(71) Applicant: LG ELECTRONICS INC., Seoul (KR)

(72) Inventors: Seokmin Shin, Seoul (KR); Hanjun Park, Seoul (KR); Hyunsoo Ko, Seoul (KR); Kijun Kim, Seoul (KR); Byounghoon Kim, Seoul (KR); Eunsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 16/308,417

(22) PCT Filed: Jun. 7, 2017

(86) PCT No.: PCT/KR2017/005921
§ 371 (c)(1),
(2) Date: Dec. 7, 2018

(87) PCT Pub. No.: WO2017/213420
PCT Pub. Date: Dec. 14, 2017

(65) Prior Publication Data
US 2019/0268205 A1 Aug. 29, 2019

Related U.S. Application Data

(60) Provisional application No. 62/346,569, filed on Jun. 7, 2016, provisional application No. 62/354,125, filed on Jun. 24, 2016.

(51) Int. Cl.
*H04L 27/26* (2006.01)

(52) U.S. Cl.
CPC .......... *H04L 27/2665* (2013.01); *H04L 27/26* (2013.01); *H04L 27/2607* (2013.01); *H04L 27/2656* (2013.01); *H04L 27/2666* (2013.01)

(58) Field of Classification Search
CPC . H04L 27/26; H04L 27/2607; H04L 27/2656; H04L 27/2665; H04L 27/2666;
(Continued)

(56) References Cited

U.S. PATENT DOCUMENTS 8,422,577 B1    4/2013  Shetty et al.
9,496,976 B2 *  11/2016  Kim, II ............. H04W 36/0061
(Continued)

FOREIGN PATENT DOCUMENTS

WO    2016078524    5/2016

OTHER PUBLICATIONS

PCT International Application No. PCT/KR2017/005921, International Search Report dated Sep. 21, 2017, 4 pages.

*Primary Examiner* — Afsar M Quereshi
(74) *Attorney, Agent, or Firm* — Lee, Hong, Degerman, Kang & Waimey

(57) ABSTRACT

The present invention discloses a method for obtaining information for a cyclic prefix (CP) in a wireless communication system by a terminal and a device for the same. Specifically, a method for obtaining information for a cyclic prefix (CP) in a wireless communication system by a terminal includes: detecting a specific synchronization signal received from a base station via a first symbol of a first subframe; detecting the specific synchronization signal received from the base station via a second symbol of a second subframe; and obtaining information for the CP applied to transmission of the specific synchronization signal based on an offset value between an index of the first symbol and an index of the second symbol.

11 Claims, 7 Drawing Sheets

(58) Field of Classification Search
CPC .............. H04L 27/2655; H04L 27/2675; H04J 11/0069; H04J 11/0093; H04W 36/0061; H04W 36/08; H04W 56/00
See application file for complete search history.

(56) References Cited

U.S. PATENT DOCUMENTS

| | | | |
|---|---|---|---|
| 2011/0002430 A1* | 1/2011 | Kim | H04B 1/7083 375/362 |
| 2012/0307726 A1* | 12/2012 | Pi | H04J 11/0069 11/69 |
| 2013/0176941 A1 | 7/2013 | Swarts et al. | |
| 2015/0358801 A1* | 12/2015 | Seo | H04W 8/005 370/329 |
| 2016/0087706 A1* | 3/2016 | Guey | H04B 7/0617 375/267 |

* cited by examiner (a) Normal CP case (b) Extended CP case x-PSS   Extended CP   Normal CP

METHOD FOR OBTAINING INFORMATION ABOUT CYCLIC PREFIX IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/005921, filed on Jun. 7, 2017, which claims the benefit of U.S. Provisional Application No. 62/346,569, filed on Jun. 7, 2016, and 62/354,125, filed on Jun. 24, 2016, the contents of which are all hereby incorporated by reference herein in their entirety.

BACKGROUND OF THE INVENTION

Technical Field

The present invention relates to a wireless communication system, and more particularly, to a method for obtaining information for a cyclic prefix (CP) using a synchronization signal and a device for supporting the same.

Background Art

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive A plurality of Input A plurality of Output (MIMO), in-band full duplex, Non-Orthogonal A plurality of Access (NOMA), the support of a super wideband, and device networking.

Technical Problem

The present invention provides a method for obtaining information (e.g., a CP length) of a cyclic prefix (CP) using a specific synchronization signal (e.g., PSS, SSS, etc.) in a wireless communication system.

More specifically, the present invention provides a method for obtaining information for a CP using an original subframe and a permuted subframe configured differently for each CP type by a UE when an eNB transmits a synchronization signal through analog beamforming.

Furthermore, the present invention provides a method for obtaining information for a CP using a symbol length configured differently for each CP type by the UE.

Furthermore, the present invention provides a method for obtaining information for a CP by combining a method using the permuted subframe and a method using the symbol length by the UE.

Furthermore, the present invention provides a method for transferring information for a CP to the UE via the synchronization signal using a sequence to which the information for the CP length is mapped.

Technical objects to be achieved by the present invention are not limited to the aforementioned technical objects, and other technical objects not described above may be evidently understood by a person having ordinary skill in the art to which the present invention pertains from the following description.

SUMMARY OF THE INVENTION

According to an embodiment of the present invention, a method for obtaining information for a cyclic prefix (CP) in a wireless communication system by a terminal includes: detecting a specific synchronization signal received from a base station via a first symbol of a first subframe; detecting the specific synchronization signal received from the base station via a second symbol of a second subframe; and obtaining information for the CP applied to transmission of the specific synchronization signal based on an offset value between an index of the first symbol and an index of the second symbol, in which the second subframe includes a subframe in which a symbol index is permuted according to a preconfigured pattern for the CP, and the offset value between the index of the first symbol and the index of the second symbol indicates a CP type for the CP among one or more CP types supported in the wireless communication system.

Furthermore, in an embodiment of the present invention, in the first subframe, the specific synchronization signal may be transmitted by using a first beam set configured by a plurality of beams allocated to a plurality of symbols of the first subframe, respectively, in the second subframe, the specific synchronization signal may be transmitted by using a second beam set configured by a plurality of beams allocated to a plurality of symbols of the second subframe, respectively, and the first beam set and the second beam set may be configured for different CP types, respectively.

Furthermore, in an embodiment of the present invention, a beam allocated to the first symbol among the plurality of beams of the first beam seat may be identical to a beam allocated to the second symbol among the plurality of beams of the second beam set.

Furthermore, the beam allocated to the first symbol and the beam allocated to the second symbol may include a specific beam in which a signal detected by the terminal is transmitted among a plurality of beams of the base station.

Furthermore, in an embodiment of the present invention, the detecting of the specific synchronization signal may comprise detecting a peak value among values for the specific value for the specific signal.

Furthermore, in an embodiment of the present invention, candidates of the offset value between the index of the first symbol and the index of the second symbol may be preconfigured between the base station and the terminal, and the candidates may be mapped for each CP type.

Furthermore, in an embodiment of the present invention, a difference value between a timing when the first subframe is transmitted and a timing when the second subframe is transmitted may be defined as a multiple of a transmission period of the specific synchronization signal.

Furthermore, in an embodiment of the present invention, the second beam set may include a beam set in which the plurality of beams of the first beam set are permuted according to the preconfigured pattern.

Furthermore, in an embodiment of the present invention, the method may further include receiving, from the base station, a synchronization signal including information indicating the second subframe.

Furthermore, in an embodiment of the present invention, the method may further include: detecting the specific synchronization signal received from the base station via a third symbol of the first subframe, wherein a difference between the third symbol and the first symbol corresponds to a symbol length corresponding to a specific CP; calculating a sum of a peak value for the specific synchronization signal received via the first symbol and a peak value for the specific synchronization signal received via the third symbol; and determining, when the calculated sum is larger than a preconfigured threshold value, whether the temporary CP matches the CP obtained based on the offset value by determining the specific CP as the temporary CP for the specific synchronization signal.

According to another embodiment of the present invention, a terminal for obtaining information for a cyclic prefix (CP) in a wireless communication system includes: a transceiver for transmitting and receiving a radio signal; and a processor functionally connected to the transceiver. The processor controls to detect a specific synchronization signal received from a base station via a first symbol of a first subframe, detect the specific synchronization signal received from the base station via a second symbol of a second subframe, and obtain information for the CP applied to transmission of the specific synchronization signal based on an offset value between an index of the first symbol and an index of the second symbol, and the second subframe includes a subframe in which a symbol index is permuted according to a preconfigured pattern for the CP, and the offset value between the index of the first symbol and the index of the second symbol indicates a CP type for the CP among one or more CP types supported in the wireless communication system.

Advantageous Effects

According to an embodiment of the present invention, a UE can obtain information (e.g., a CP length) for a cyclic prefix (CP) using only one synchronization signal received from an eNB.

Furthermore, according to an embodiment of the present invention, even when synchronization signals are transmitted in a frequency division multiplexing (FDM) scheme, the UE can obtain the information for the CP using the synchronization signal.

Furthermore, according to an embodiment of the present invention, as 2-step procedures are performed in order to obtain the information for the CP, an error for acquisition of CP information can be corrected.

Effects which may be obtained by the present invention are not limited to the aforementioned effects, and other technical effects not described above may be evidently understood by a person having ordinary skill in the art to which the present invention pertains from the following description.

BRIEF DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

DETAILED DESCRIPTION OF EXEMPLARY EMBODIMENTS

Figure 1:
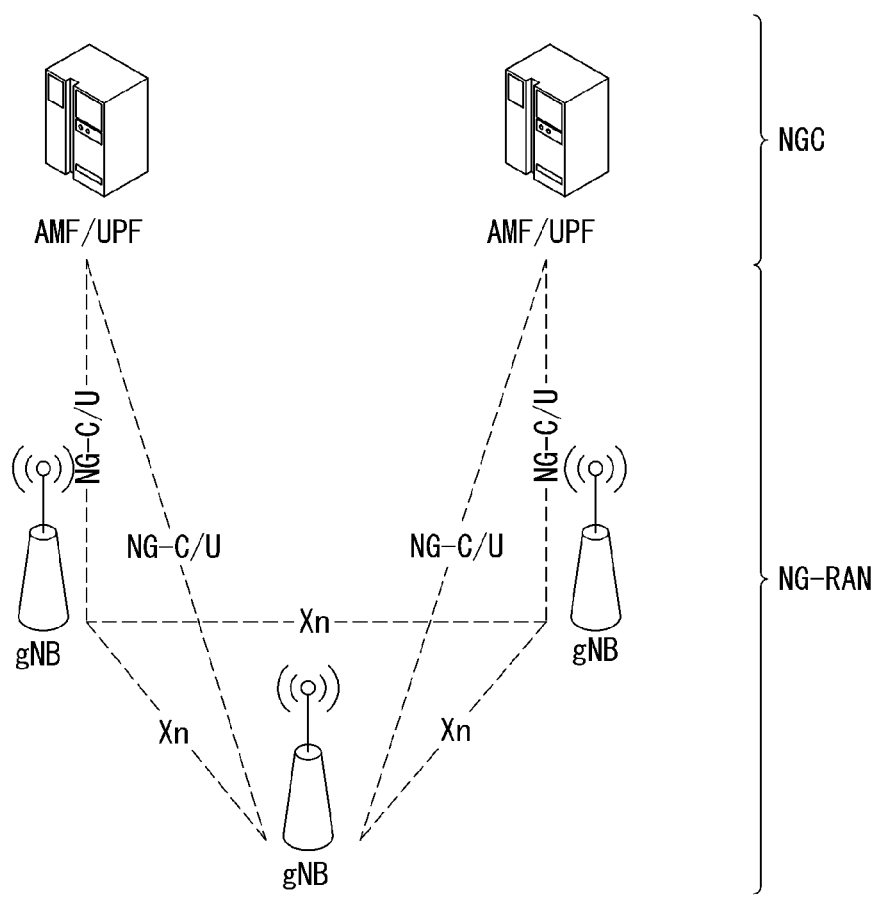
FIG. 1 is a diagram illustrating an example of a general system configuration of a new RAT (NR) to which a method proposed in this specification may be applied.

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network configured by a plurality of network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division a plurality of access (CDMA), frequency division a plurality of access (FDMA), time division a plurality of access (TDMA), orthogonal frequency division a plurality of access (OFDMA), single carrier-FDMA (SC-FDMA), non-orthogonal a plurality of access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed.

In the following specification, for convenience of description, a next-generation radio access technology is referred to as a new RAT (NR, radio access technology). A wireless communication system to which the NR is applied is referred to as an NR system.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerologies and Frame Structure

In the NR, a plurality of numerologies is supported. The numerology is defined by a subcarrier spacing and CP overhead. A plurality of subcarrier spacings may be derived by scaling a basic subcarrier spacing by an integer N. A numerology used may be selected independently of a frequency band although it is assumed that a very low subcarrier spacing is not used in a very high carrier frequency. In this case, a flexible network and a UE channel bandwidth are supported.

In the RAN1 spec viewpoint, a maximum channel bandwidth per NR carrier is 400 MHz. In the case of at least one numerology, the candidates of a maximum subcarrier number per NR carrier are 3300 or 6600 in the RAN1 spec. viewpoint.

Subframe duration is fixed to 1 ms, and a frame length is 10 ms. A scalable numerology needs to permit a subcarrier spacing of at least 15 kHz~480 kHz. All numerologies having a great subcarrier spacing of 15 kHz or more regardless of CP overhead are arranged in a symbol boundary for each 1 ms of an NR carrier.

More specifically, normal CP series are selected as follows.

If a subcarrier spacing is 15 kHz*$2^n$ (n is an integer not a negative number), Each symbol length (including a CP) of the 15 kHz subcarrier spacing is identical with the sum of corresponding $2^n$ symbols of a scaled subcarrier spacing.

In each 0.5 ms, all OFDM symbols within 0.5 ms have the same size in addition to the first OFDM symbol.

The first OFDM symbol within 0.5 ms is 16 Ts (assuming 15 kHz and an FFT size of 2048) longer than other OFDM symbols.

16 Ts are used in a CP for the first symbol.

If a subcarrier spacing is 15 kHz*$2^n$ (n is a negative integer)

Each symbol length (including a CP) of the subcarrier spacing is the same as the sum of corresponding $2^n$ symbols of 15 kHz.

A resource defined by one subcarrier and one symbol is called a resource element (RE).

A physical layer design supports an extended CP. The extended CP is only one in a given subcarrier spacing. An LTE-scaled extended CP is supported in at least 60 kHz subcarrier spacing. A CP type may be semi-statically configured using UE-specific signaling. A UE supporting an extended CP may depend on a UE type/capability.

The number of subcarriers per PRB is 12. An explicit DC subcarrier is not reserved for both the downlink and uplink. Regarding a DC present within a transmitter, DC processing of a DC subcarrier on the transmitter side is regulated as follows.

A receiver is aware of where a DC subcarrier is placed or whether the location of a DC subcarrier is notified (e.g., by spec. or signaling) or aware of whether a DC subcarrier is not present within a receiver bandwidth.

In the case of the downlink, a UE may assume that a DC subcarrier transmitted by the transmitter (gNB) side has been modulated. That is, data is not rate-matched or punctured.

In the case of the uplink, a DC subcarrier transmitted by the transmitter (UE) side is modulated. That is, data is not rate-matched or punctured.

In the case of the uplink, the transmitter DC subcarrier of the transmitter (UE) side needs to avoid a collision against at least DMRS.

At least one specific subcarrier needs to be defined as the candidate location of a DC subcarrier with respect to the uplink. For example, the DC subcarrier is positioned at the boundary of a PRB.

In the case of the uplink, means for allowing a receiver to determine a DC subcarrier position needs to be designated.

This is associated with a DC subcarrier position written in semi-static signaling from a UE and the standard.

If a DC subcarrier is not present, all subcarriers within a receiver bandwidth are transmitted.

In contrast, on the receiver side, special handling of a DC subcarrier has not been regulated in RAN1 on the receiver side. An operation needs to be implemented. That is, for example, the receiver may puncture data received in a DC subcarrier.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or at least one downlink portion and at least one uplink portion. A slot set is supported. That is, data transmission may be scheduled as one or a plurality of slot spacings.

Furthermore, a mini-slot having the following length is defined.

A mini-slot having at least 6 GHz or more, length 1 symbol is supported.

Lengths from a length 2 to a slot length −1

In the case of URLLC, at least two are supported.

When a slot level channel/signal/procedure is designed, the followings need to be considered.

The possible occurrence of a mini-slot/slot transmission(s) that occupies resources scheduled for the on-going slot transmission(s) of a given carrier with respect to the same/different UEs.

At least one of DMRS formats/structures/configurations for a slot level data channel is reused for a mini-slot level data channel.

At least one of DL control channel formats/structures/configurations for slot level data scheduling is designed to be applied to mini-slot level data scheduling.

At least one of UL control channel formats/structures/configurations for slot level UCI feedback is designed to be applied to mini-slot level UCI feedback.

The following use case for designing a mini-slot is considered.

Support of a very low latency time including an URLLC with respect to a specific slot length.

A target slot length is at least 1 ms, 0.5 ms.

In particular, if a TXRP uses beam-sweeping (e.g., 6 GHz or more), a finer TDM granularity for the same or different UE within a slot is supported.

NR-LTE co-existence

Forward compatibility for an unlicensed spectrum operation

Self-Contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

Figure 2:
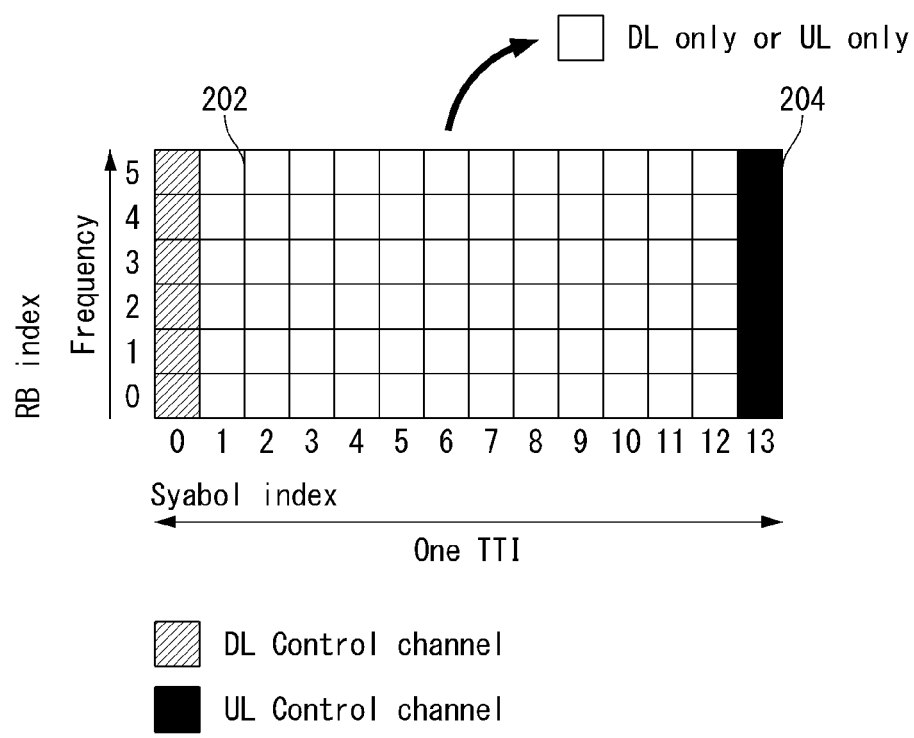
FIG. 2 illustrates an example of a self-contained subframe structure to which a method proposed in this specification may be applied.

FIG. 2 illustrates an example of a self-contained subframe structure to which the method proposed by the present invention may be applied. FIG. 2 is only for convenience of description and does not limit the scope of the present invention.

Referring to FIG. 2, as in the case of legacy LTE, a case where one subframe includes 14 orthogonal frequency division multiplexing (OFDM) symbols is assumed.

In FIG. 2, a region 202 means a downlink control region, and a region 204 means an uplink control region. Furthermore, a region (i.e., region not having separate indication) other than the region 202 and the region 204 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure shown in FIG. 2 is used, downlink transmission and uplink transmission are sequentially performed and the transmission of downlink data and the reception of uplink ACK/NACK may be performed within one self-contained subframe.

As a result, when an error in data transmission occurs, the time taken up to the retransmission of data can be reduced. Accordingly, latency related to data delivery can be minimized.

In a self-contained subframe structure such as FIG. 2, there is a need for a time gap for a process for a base station (eNodeB, eNB, gNB) and/or a terminal (user equipment (UE)) to switch from a transmission mode to a reception mode or from the reception mode to the transmission mode. In relation to the time gap, if uplink transmission is performed after downlink transmission in the self-contained subframe, some OFDM symbol(s) may be configured as a guard period (GP).

Synchronization Signal and Downlink Broadcast Signal/Channel Structure

An NR synchronization signal is based on cyclic prefix-orthogonal frequency division multiplexing (CP-OFDM).

NR defines at least two types of synchronization signals including NR-PSS and NR-SSS. Here, the NR-PSS is defined for initial symbol boundary synchronization for at least an NR cell. Further, the NR-SSS is defined to detect an NR cell ID or at least a part of the NR cell.

In this case, detection of the NR-SSS is based on a fixed time/frequency relationship with an NR-PSS resource position regardless of a duplex mode and a beam operation type within at last given frequency range and CP overload. In this case, a normal CP is at least supported in the NR-PSS/SSS.

In addition, A raster for the NR synchronization signal may be different for each frequency range. When the NR supports a wider carrier bandwidth and operates in a wider frequency spectrum (e.g., 6 GHz or higher), the raster for the NR synchronization signal may be configured to be larger than a raster for 100 kHz of LTE.

When a synchronization signal bandwidth is equal to a minimum system bandwidth for a given frequency band which a UE searches, a synchronization signal frequency raster is the same as a channel raster.

In the case of a carrier that supports an initial access, a minimum carrier bandwidth of the NR may be 5 MHz or 10 MHz in a frequency range of up to 6 GHz and is set differently according to a frequency band. In a frequency range of 6 GHz to 52.6 GHz, the minimum carrier bandwidth of the NR may be 40 MHz or 80 MHz and is set differently according to the frequency band.

Further, at least one broadcast channel (NR-PBCH) is defined. NR-PBCH decoding is based on a fixed relationship with NR-PSS and/or NR-SSS resource positions, at least within a given frequency range and CP overhead, regardless of a duplex mode and a beam operation type. The NR-PBCH is a non-scheduled broadcast channel that carries at least some of minimum system information having periodicity predefined in a specification according to a carrier frequency range and a fixed payload size.

In both single-beam and multi-beam scenarios, time division multiplexing (TDM) of the NR-PSS, the NR-SSS, and the NR-PBCH may be supported. The NR-PSS, the NR-SS, and/or the NR-PBCH may be transmitted in an SS block. For a given frequency band, the SS block corresponds to N OFDM symbols based on a default subcarrier spacing and the N is a constant. A signal multiplexing structure is fixed to the specification. The UE should be at least identify a radio frame number from an OFDM symbol index, a slot index in a radio frame, and a radio frame number from the SS block.

One or a plurality of SS block(s) constitutes an SS burst. One or a plurality of SS burst(s) further constitute an SS bust set which is the number of SS bursts in the SS burst set is finite.

In terms of a physical layer specification, at least one periodicity of the SS burst set is supported. From the viewpoint of the UE, transmission of the SS burst set may be periodic and the UE may assume that a given SS block is repeated according to the periodicity of the SS burst set. In this case, NR-PBCH contents of a given repeated SS block may be changed. A single set of available SS block time locations is designated for each frequency band. Further, the maximum number of SS blocks in the SS burst set may vary depending on a carrier frequency.

Locations of actually transmitted SS blocks may be notified for a CONNECTED mode UE to help receiving DL data/control in unused SS blocks, for an IDLE mode UE to help receiving the DL data/control in the unused SS blocks, and to help CONNECTED/IDLE mode measurement. For initial cell selection, the UE may assume a default SS burst set period that may be set differently according to the frequency band. In the case of at least a plurality of beams, at least the time index of the SS block is indicated to the UE.

In the case of the CONNECTED and IDLE mode UEs, the NR supports the SS burst set periodicity and a network indication of information for deriving measurement timing/duration (e.g., a time window for NR-SS detection).

A network provides one SS burst set periodicity information to the UE every frequency carrier and provides information for deriving the measurement timing/duration if possible. When one piece of information regarding one SS burst set periodicity and timing/duration is indicated, the UE assumes the periodicity and the timing/duration for all cells on the same carrier. When the network does not provide information for indicating the SS burst set periodicity and deriving the measurement timing/duration, the UE assumes 5 ms as the SS burst set periodicity. The NR supports a set of SS burst set periodicity values for adaptation and network indication.

For the initial access, the UE may assume a signal corresponding to a specific subcarrier spacing of the NR-PSS/SSS in the frequency band given by the specification.

In the case of the NR-PSS, a Zadoff Chu-sequence may be used as a reference sequence of the NR-PSS. In the case of a sequence based synchronization signal design, at least one basic sequence length is defined with respect to each synchronization signal. In this case, the number of antenna ports of the NR-PSS is 1.

In the case of NR-PBCH transmission, antenna ports of a single fixed number are supported. An NR-PBCH transmission scheme or blind detection of the number of antenna ports is not requested by the UE. The UE assumes PBCH numerology which is the same as numerology of the NR-SS. For transferring minimum system information, some of minimum system information is transmitted to the NR-PBCH. The NR-PBCH contents need to include at least a part of a system frame number (SFN) and a CRC. The remaining minimum system information is transmitted to a shared downlink channel via an NR-PDSCH.

Analog Beamforminq

In a millimeter wave (mmWave, mmW) communication system, as the wavelength of the signal becomes shorter, a plurality of (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using a plurality of antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping a plurality of antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

In this specification, contents of a synchronization signal to be used for an initial access procedure in a new system (i.e., an NR system) are described.

In this case, in order to distinguish the corresponding system from the legacy LTE system, a physical signal and/or a physical channel used in the corresponding system may be designated (or defined) as an x-Primary Synchronization signal (PSS), an x-Secondary Synchronization Signal (SSS), an x-Physical Broadcast Channel (PBCH), an x-Physical Downlink Control Channel (PDCCH)/x-Enhanced PDCCH (EPDCCH), etc to which 'x-' is added. Here, the 'x' may include 'NR'.

Further, a synchronization signal (SS) considered in this specification refers to signals used by the UE to perform synchronization, such as x-PSS, x-SSS, and/or x-PBCH.

In addition, in this specification, a case in which the x-PSS, the x-SSS, and an additional synchronization signal (e.g., ESS) is frequency division multiplexed (FDM).

Figure 3:
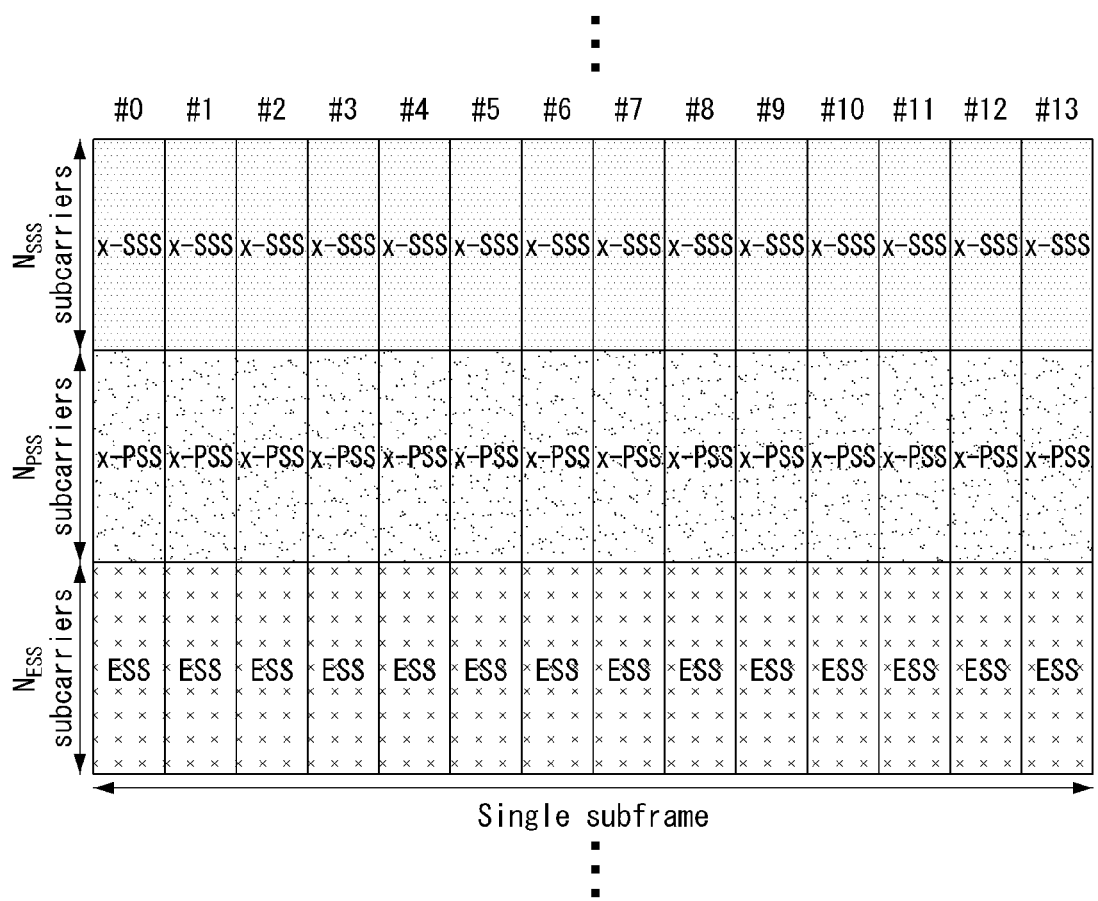
FIG. 3 illustrates an example of a synchronized signal multiplexed by an FDM scheme to which a method proposed in the present invention may be applied.

FIG. 3 illustrates an example of a synchronized signal multiplexed by an FDM scheme to which a method proposed in the present invention may be applied. FIG. 3 is just for convenience of the description and does not limit the scope of the present invention.

Referring to FIG. 3, the x-SSS, the x-PSS, and the ESS are transmitted via Nsss subcarriers, $N_{PSS}$ subcarriers, and NESS subcarriers, respectively.

However, in this specification, the synchronization signals are expressed as being multiplexed by the FDM scheme only for convenience of description. However, a method proposed in this specification may be applied not only to the FDM scheme but also to other multiplexing schemes (e.g., Time Division multiplexing (TDM) scheme).

For example, in a wireless communication system in which two or more synchronization signals are transmitted according to a TDM scheme, a first synchronization signal (e.g., x-PSS) is transmitted via a plurality of consecutive symbols and a second synchronization signal (e.g., x-SSS) is transmitted via next consecutive a plurality of symbols, the method proposed in this specification may be applied.

In the NR system, a scheme that transmits the synchronization signal using an analog beamforming scheme may be considered.

In this case, the eNB may transmit the synchronization signal using a beam direction configured differently for each symbol at the time of transmitting the synchronization signal (i.e., a synchronization subframe, etc.). In this case, the UE may obtain synchronization with respect to a time and a frequency based on a synchronization signal transmitted in a beam direction best suited for a user.

In the NR system, usage scenarios (i.e., services) having different service requirements are supported. For example, the NR system supports services including Enhanced Mobile Broadband (eMBB), Ultra-Reliable and Low Latency Communication (URLLC), massive Machine Type Communication (mMTC), and the like.

However, a Key Performance Indicator (KPI) required by each of the services is different, and thus, numerologies of a subcarrier spacing, a subframe length, a CP length, and the like need to be configured differently.

Further, there may be a case in which as one NR system supports a plurality of services configured as different numerologies, different numerologies are multiplexed (or coexist).

More specifically, based on characteristics of the service, a numerology for a URLLC service requiring short term symbol duration and/or subframe duration and a numerology for an eMBB service requiring general (or long) symbol duration and/or subframe duration and/or a numerology for an mMTC service may coexist.

As an example, the eMBB/mMTC service and the URLLC service may be provided through different numerologies.

As described above, when different numerologies are multiplexed, a method in which different numerologies (i.e., services) share the synchronization signal and a method in which the UE detects the synchronization signal are described in this specification.

When different numerologies are multiplexed in one system or one carrier, different numerologies may be at least configured to share the same numerology with respect to the synchronization signal. In other words, a fact that different numerologies are multiplexed means that different services may be serviced by different numerologies and a common numerology may be used for transmission of the synchronization signal of each service.

Here, a case in which the common numerology is used means that the subcarrier spacing in which the synchronization signal is transmitted, etc. is set according to a default numerology set to a default value (or a common value) regardless of a type of service.

In this case, it may be assumed that the UE recognizes that the synchronization signal is transmitted according to a predetermined default numerology.

Hereinafter, in this specification, it is assumed that the UE knows in advance the subcarrier spacing of the synchronization signal transmitted from the eNB. For example, it is assumed that it is predetermined that a default subcarrier spacing is used for the transmission of the synchronization signal, that the UE determines the subcarrier spacing of the synchronization signal through an additional operation such as blind detection, or that the UE knows the subcarrier spacing of the synchronization signal by receiving the corresponding information such as signaling.

In this case, an applied cyclic prefix length (i.e., CP length) may be selected within a predetermined (i.e., defined) number/type. For example, the applied CP length may be selected between a normal CP and an extended CP.

In the NR system, a case where one CP length (e.g., $CP_0$) is used for the transmission of all signals or a case where a predetermined CP length (e.g., $CP_f$) is used for transmission of some signals is used and another CP length (e.g., $CP_0$) is used for transmission of the remaining signals may be considered. Here, the CP length means the length according to each CP type and the division by the CP length can mean the division by the CP type.

For each case, the UE needs to obtain information for the CP length used for signal transmission.

Hereinafter, in this specification, the method for obtaining the information for the CP length by the CP for each case will be described in detail.

Further, hereinafter, respective embodiments are distinguished for each description and the respective embodiments may be implemented combinationally with each other or independently.

(1) Method for Obtaining Information for CP Type when One CP Type is Used for Signal Transmission As described above, it is assumed that the UE knows in advance the information for the subcarrier spacing (i.e., numerology) applied to the synchronization signal and it is assumed that the same CP length (e.g., $CP_0$) is used for transmission of the synchronization signal and a data signal.

In this case, as the method (i.e., a method for detecting the CP length) for obtaining the information for the CP type by the UE, 1) a method of using a beam set configured differently for each synchronization subframe and 2) a method of using a sequence of the synchronization signal including the information for the CP length may be considered.

1) Method for Determining CP Type by Using Beam Set Configured Differently for Each Synchronization Subframe Depending on an order in which different beams used for transmission of the synchronization signal are arranged, specific N beam sets may be predetermined corresponding to specific N CP types.

In this case, the eNB may be repeatedly configured to transmit the synchronization signal by using different types of beam sets for each synchronization subframe. That is, symbol indexes to which a plurality of beams are mapped may be differently configured, respectively for each synchronization subframe. In this case, the synchronization signal may be the x-PSS, the x-SSS, etc.

Specifically, when N CP types exist, an offset of a symbol in which a peak value of the synchronization signal for the same beam direction is detected in a subframe (i.e., synchronization subframe) may be configured for each of N CP types.

In other words, a timing offset at which the peak value of the corresponding synchronization signal is detected for each period in which the synchronization signal is transmitted may be set to $M_i$ for a CP type $N_i$. Here, the i means integers of 1 to N−1. That is, the number of CP types and the set number of timing offsets are the same as each other.

In this case, information for the offset needs to be predetermined between the eNB and the UE. In this case, the information for the offset may be preconfigured on the system or may be shared through signaling (e.g., higher layer signaling) between the eNB and the UE.

In addition, the number of OFDM symbols constituting one subframe may be defined differently for each CP type. For example, when there are the normal CP and the extended CP as the CP type, the normal CP may be configured to use 14 OFDM symbols and the extended CP may be configured to use 12 OFDM symbols.

In this case, the ENB may transmit the synchronization signal to the original subframe and the permuted subframe by using different types of beam sets.

Here, the permuted subframe means a subframe in which an order of beams used for transmitting the synchronization signal is permuted according to the offset (i.e., timing offset) value set according to the CP type described above.

That is, the permuted subframe may mean a subframe to which a beam set (e.g., second beam set) different from a beam set (e.g., first beam set) applied to the original subframe in association with transmission of the synchronization signal.

The permuted subframe is configured differently for each CP type and specifically, an offset value calculated by using the peak value for the synchronization signal is configured differently for each CP type.

In this case, the number of beams viewed from the viewpoint of the UE may be one or two or more. In other words, the UE may detect the synchronization signal transmitted from one beam among beams from which the synchronization signal is transmitted or detect the synchronization signals transmitted from two or more beams.

In an embodiment of the present invention, when the UE may view only one among a plurality of beams (e.g., b0 to b13 or b0 to b11) (that is, when the UE may detect only the synchronization signal transmitted from one beam), the UE may determine the CP length by using a difference between a time when the peak value of the x-PSS is detected in the original subframe and a time when the peak value of the x-PSS is detected in the permuted subframe.

In this case, configuration information for the permitted subframe needs to be predefined or needs to be shared through signaling (e.g., higher layer signaling) or physical layer signaling between the eNB and the UE.

Figure 4:
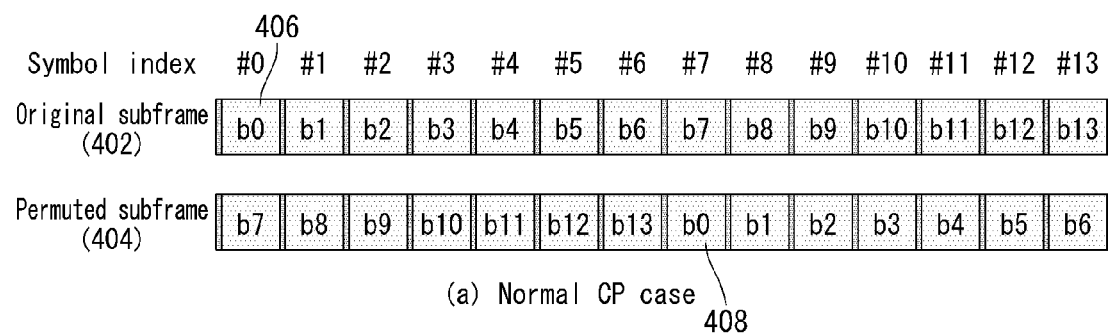
FIG. 4 illustrates an example of an original subframe and a permuted subframe for obtaining information for a CP type according to an embodiment of the present invention.
Figure 4:
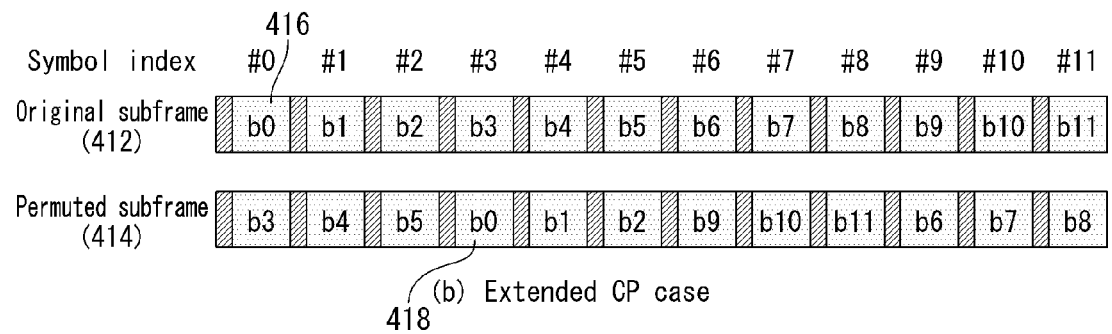
Figure 4:
Figure 4:
Figure 4:

FIG. 4 illustrates an example of an original subframe and a permuted subframe for obtaining information for a CP type according to an embodiment of the present invention. FIG. 4 is just for convenience of the description and does not limit the scope of the present invention.

Referring to FIG. 4, it is assumed that the eNB uses an analog beamforming scheme in order to transmit the synchronization signal and the CP type is divided into the normal CP and the extended CP.

Further, b0 to b13 illustrated in FIG. 4(a) means indexes of 14 beams of the eNB, which are used for transmitting the x-PSS to which the normal CP is applied and means indexes of the eNB, which are used for transmitting the x-PSS to which the extended CP is applied.

FIG. 4(a) illustrates an original subframe 402 and a permuted subframe 404 for the normal CP. In this case, the permuted subframe may be configured according to a rule (or pattern) predefined on the system. As an example, in the case of FIG. 4(a), the permuted subframe 404 may be configured according to Equation 1 below.

$$Sym_i^{Perm}=Sym_{i+7}^{Orig} \text{ where, } 0 \le i \le 6$$

$$Sym_i^{Perm}=Sym_{i-7}^{Orig} \text{ where, } 7 \le i \le 13 \quad \text{[Equation 1]}$$

In Equation 1, $Sym_N^{orig}$ represents an $N^{th}$ symbol of the original subframe and $Sym_N^{Perm}$ represents an $N^{th}$ symbol of the permuted subframe. Further, i represents a symbol index in a subframe. Here, N and i represent integers of 0 to 13.

Further, $Sym_n^{Perm}=Sym_m^{Orig}$ indicates that all of the beam direction, the transmitted sequence, and the like used in an $n^{th}$ symbol of the permuted subframe are the same as all of the beam direction, the transmitted sequence, and the like used in an $m^{th}$ symbol of the original subframe.

In other words, the beam set applied to the permuted subframe for the normal CP means a beam set in which beams (i.e., indexes of the beams) applied to the original subframe for the normal CP are permuted according to Equation 1.

On the contrary, FIG. 4(b) illustrates an original subframe 412 and a permuted subframe 414 for the extended CP. In this case, the permuted subframe may be configured according to a rule (or pattern) predefined on the system. As an example, in the case of FIG. 4(b), the permuted subframe 414 may be configured according to Equation 2 below.

$$Sym_i^{Perm}=Sym_{i+3}^{Orig} \text{ where, } 0 \le i \le 2 \text{ and } 6 \le i \le 8$$

$$Sym_i^{Perm}=Sym_{i-3}^{Orig} \text{ where, } 3 \le i \le 5 \text{ and } 9 \le i \le 11 \quad \text{[Equation 2]}$$

In Equation 2, $Sym_N^{Orig}$ represents an $N^{th}$ symbol of the original subframe and $Sym_N^{Perm}$ represents an $N^{th}$ symbol of the permuted subframe. Further, i represents the symbol index in the subframe. Here, N and i represent integers of 0 to 11.

Further, $Sym_n^{Perm}=Sym_m^{Orig}$ indicates that all of the beam direction, the transmitted sequence, and the like used in an $n^{th}$ symbol of the permuted subframe are the same as all of the beam direction, the transmitted sequence, and the like used in an $m^{th}$ symbol of the original subframe.

In other words, the beam set applied to the permuted subframe for the extended CP means a beam set in which beams (i.e., indexes of the beams) applied to the original subframe for the extended CP are permuted according to Equation 2.

Referring to FIG. 4, the UE detects the x-PSS transmitted in the original subframe to obtain the peak value at to and detects the x-PSS transmitted in the permuted subframe to obtain the peak value at time $t_1$. Here, the permuted subframe is transmitted before or after $P_{PSS}$ (ms) after the original subframe is transmitted according to a transmission period ($P_{PSS}$) of the x-PSS.

With detection of the peak value, the UE may determine a difference value of a time when the peak value is detected in each subframe, that is, a value of $t_1-t_0$. In this case, the UE may obtain the information for the CP length according to the difference value.

Specifically, in the case of FIG. 4(a), that is, the normal CP, a peak value 406 for the x-PSS transmitted via the beam b0 in symbol index #0 (i.e., $t_0$) of the original subframe 402 may be detected and a peak value 408 for the x-PSS transmitted via the beam b0 in symbol index #7 (i.e., $t_1$) of the permuted subframe 404 transmitted before or after $P_{PSS}$ ms may be detected.

When the length of the subframe is set to 1 ms, the offset value between symbol index #0 and symbol index #7 may be calculated as 0.5 ms. Consequently, in the case of the normal CP, the UE may know that the value of $t_1-t_0$ is different from the period (i.e., $P_{PSS}$) of the x-PSS by 0.5 ms. That is, in the case of the normal CP, the value of $t_1-t_0$ may be $P_{PSS}$+0.5 ms or $P_{PSS}$−0.5 ms.

On the contrary, in the case of FIG. 4(b), that is, the extended CP, a peak value 416 for the x-PSS transmitted via the beam b0 in symbol index #0 (i.e., $t_0$) of the original subframe 412 may be detected and a peak value 418 for the x-PSS transmitted via the beam b0 in symbol index #3 (i.e., $t_1$) of the permuted subframe 414 transmitted before or after $P_{PSS}$ ms may be detected.

When the length of the subframe is set to 1 ms, the offset value between symbol index #0 and symbol index #3 may be calculated as 0.25 ms. Consequently, in the case of the extended CP, the UE may know that the value of $t_1-t_0$ is different from the period of the x-PSS by 0.25 ms. That is, in the case of the extended CP, the value of $t_1-t_0$ may be $P_{PSS}$+0.25 ms or $P_{PSS}$−0.25 ms.

Accordingly, the UE may determine whether the CP type applied to the transmission of the synchronization signal is the normal CP or the extended CP according to the time difference described above.

In addition, a method may be considered in which the UE accumulates a plurality of subframes to find a maximum peak value in order to estimate the CP length (or CP type) by obtaining an accurate peak value.

Specifically, the UE may be configured to find a time when the peak value exceeds a predetermined threshold value by accumulating samples in t0, t0+$P_{PSS}$+$t_{gap}$, t0+2$P_{PSS}$, t0+3$P_{PSS}$+$t_{gap}$, . . . or accumulating samples in t0, t0+$P_{PSS}$−$t_{gap}$, t0+2$P_{PSS}$, t0+3$P_{PSS}$−$t_{gap}$, . . . . In this case, the $t_{gap}$ may represent the timing offset value set for each CP type and may be 0.5 ms or 0.25 ms in the case of the example of FIG. 4.

In the case of the above-described scheme, a UE that is to detect a synchronization subframe at a certain time may distinguish whether a currently monitored subframe is the original sub-frame or the permuted subframe, but i is possible to distinguish the applied CP length (that is, to distinguish between the normal CP and the extended CP) using the difference value calculated via the x-PSS.

When the UE obtains the information for the CP length via the x-PSS, the UE may know fine frequency/time synchronization and cell ID via the x-SSS.

Further, in order to distinguish the original subframe from the permuted subframe, a method for transferring a predetermined permuted subframe indicator (e.g., 1 bit) via an additional synchronization signal (e.g., ESS) may be considered. For example, in the case of the original subframe, the permuted subframe indicator may be set to 0 and in the case of the permuted subframe, the permuted subframe indicator may be set to 1.

Thereafter, the UE decodes the x-PBCH to obtain a Master Information Block (MIB) and may receive system information (SI) and then, obtain information of a subband in which a service desired by the UE is transmitted. Thereafter, the UE may perform transmission/reception of data by moving to the corresponding subband.

In FIG. 4 described above, it is assumed that the eNB transmits the synchronization signal by using the analog beamforming. However, even in a frequency band not using the analog beamforming, the method described in FIG. 4 may be partially changed and applied.

In other words, even when the x-PSS is transmitted in a specific symbol of one subframe, a method for distinguishing the CP length (i.e., CP type) by using the original subframe and the permuted subframe may be considered.

Figure 5:
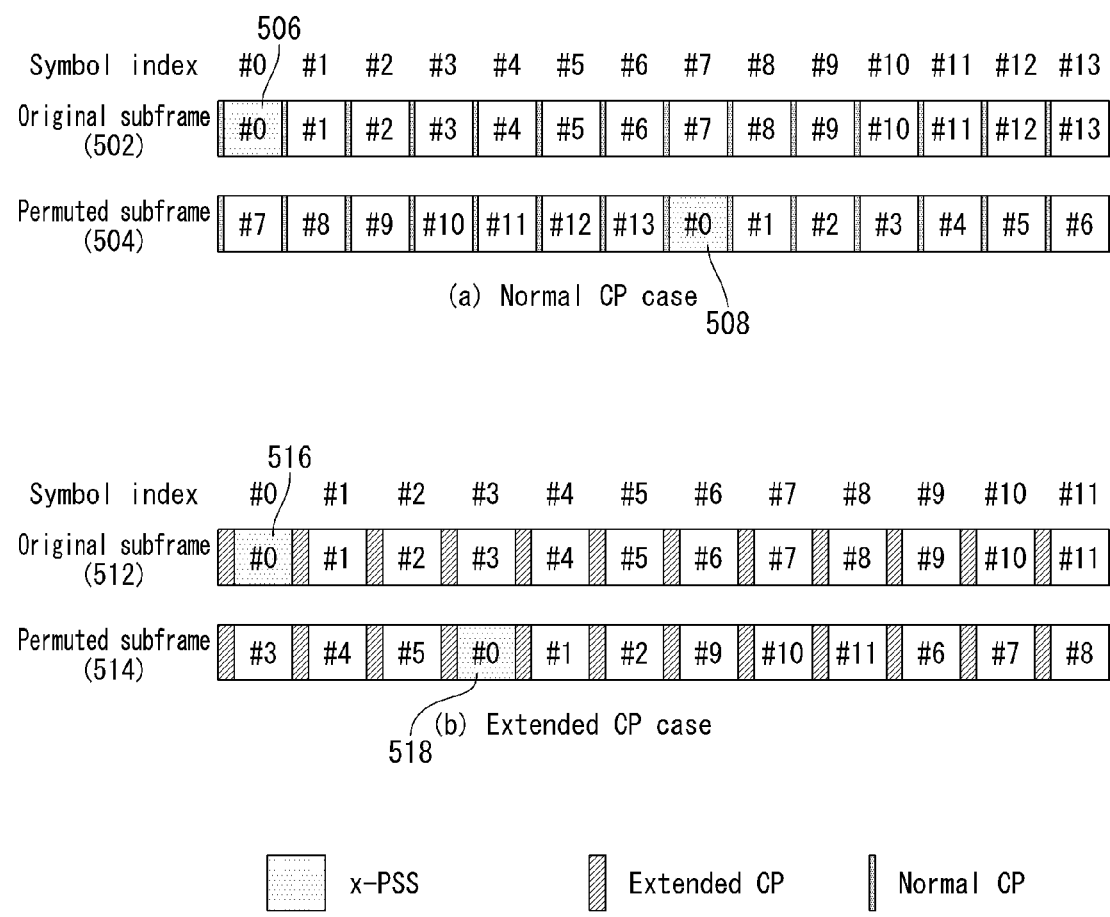
FIG. 5 illustrates another example of an original subframe and a permuted subframe for obtaining information for a CP type according to an embodiment of the present invention.

FIG. 5 illustrates another example of an original subframe and a permuted subframe for obtaining information for a CP type according to an embodiment of the present invention. FIG. 5 is just for convenience of the description and does not limit the scope of the present invention.

Referring to FIG. 5, it is assumed that the eNB transmits the synchronization signal using a specific symbol (e.g., symbol #0) in a subframe without using the analog beamforming.

FIG. 5(a) illustrates an original subframe 502 and a permuted subframe 504 in the case of the normal CP and is similar to FIG. 4(a) except that the x-PSS is transmitted not in all symbols but in the specific symbol.

Further, FIG. 5(b) illustrates an original subframe 512 and a permuted subframe 514 in the case of the extended CP and is similar to FIG. 4(b) except that the x-PSS is transmitted not in all symbols but in the specific symbol.

Even in the case of FIG. 5, as in the case of FIG. 4 described above, the UE may calculate a time difference value (i.e., $t_1-t_0$) between symbols in which the peak value is detected for each of the normal CP and the extended CP.

Specifically, in the case of FIG. 5(a), that is, the normal CP, a peak value 506 for the x-PSS transmitted in symbol index #0 of the original subframe 502 may be detected and a peak value 508 for the x-PSS transmitted in symbol index #7 of the permuted subframe 504 transmitted before or after $P_{PSS}$ ms may be detected.

Consequently, in the case of the normal CP, the UE may know that the value of $t_1-t_0$ is different from the period (i.e., $P_{PSS}$) of the x-PSS by 0.5 ms (here, it is assumed that one subframe is 1 ms).

On the contrary, in the case of FIG. 5(b), that is, the extended CP, a peak value 516 for the x-PSS transmitted in symbol index #0 of the original subframe 52 may be detected and a peak value 518 for the x-PSS transmitted in symbol index #3 of the permuted subframe 514 transmitted before or after $P_{PSS}$ ms may be detected.

Consequently, in the case of the extended CP, the UE may know that the value of $t_1-t_0$ is different from the period of the x-PSS by 0.25 ms (here, it is assumed that one subframe is 1 ms). Accordingly, the UE may determine whether the CP type applied to the transmission of the synchronization signal is the normal CP or the extended CP according to the time difference described above.

In addition, as described above, the method may be considered in which the UE accumulates a plurality of subframes to find a maximum peak value in order to estimate the CP length (or CP type) by obtaining an accurate peak value.

On the contrary, in another embodiment of the present invention, when the UE may view two or more beams of a plurality of beams (e.g., b0 to b13 or b0 to b11) supported by the eNB (i.e., when the UE may detect the synchronization signals transmitted in two or more beams), the UE may measure a measurement location of the peak value based on the symbol length and the CP length set for each CP type and distinguish the CP type by using the sum of detected peak values.

For example, in the case of the normal CP having a single subframe of 1 ms and configured by 14 OFDM symbols, the length of each of the OFDM symbols is approximately 71.3 us (a total sum of the lengths of symbol #0 and symbol #7 is 72 us) which is the total sum of the CP length and the symbol length. In this case, the UE may detect the peak value for the synchronization signal for every 71.3 us (the total sum of the lengths of symbol #0 and symbol #7 is 72 us) and store the detected peak values.

On the contrary, in the case of the extended CP having a single subframe of 1 ms and configured by 12 OFDM symbols, the length of each of the OFDM symbols is approximately 83.3 us which is the total sum of the CP length and the symbol length. In this case, the UE may detect the peak value for the synchronization signal for every 83.3 us and store the detected peak values.

The UE may store the peak values detected for each CP type and thereafter, the UE may calculate the sum of the peak values detected for each available CP type and when a maximum value in the sum of the stored peak values is larger than a predefined (or preconfigured) specific threshold value, the CP type may be distinguished.

In this case, since there may be a situation where one UE may view only one beam among several beams or a situation where one UE may view two or more beams among several beams, the aforementioned schemes (that is, a method (hereinafter, referred to as method (a) for convenience of description) in which one UE may view one beam and a method (hereinafter, referred to as a method (b) for convenience of description) in which one UE may view two or more beams)) may be combined and applied.

Figure 6:
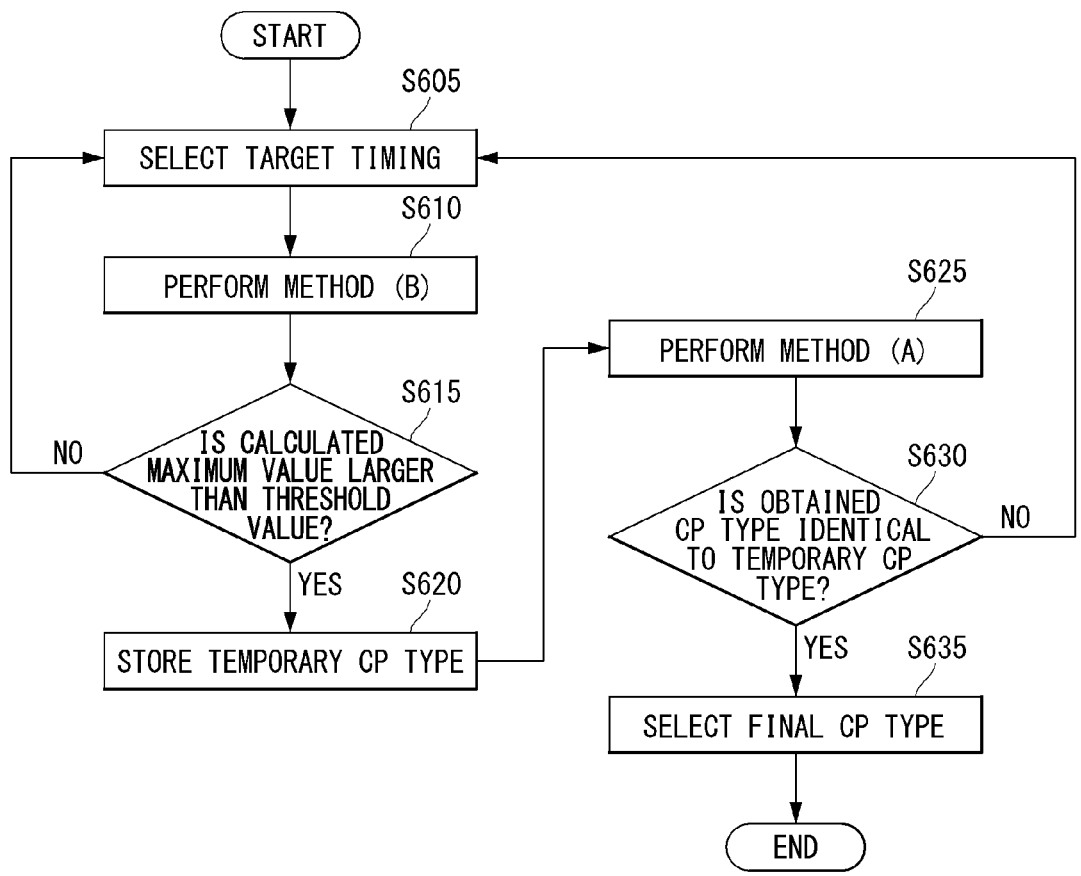
FIG. 6 illustrates an operation flowchart of a UE for obtaining information for a CP type according to various embodiments of the present invention.

FIG. 6 illustrates an operation flowchart of a UE for obtaining information for a CP type according to various embodiments of the present invention. FIG. 6 is just for convenience of the description and does not limit the scope of the present invention.

Referring to FIG. 6, in order for the UE to obtain the information for the CP length via the synchronization signal received from the eNB, it is assumed that the original subframe and a permuted subframe configured according to a specific rule are used.

In step S605, the UE receives the synchronization signal to select a target timing to obtain the information for the CP length. That is, the UE may detect the synchronization signal from the eNB in a selected specific time period. Here, the information for the CP length may mean information for the CP type.

Thereafter, in step S610, the UE calculates the peak values for the synchronization signal by performing the aforementioned method (b). The UE stores the calculated peak values and thereafter, calculates the sum of the peak values for each CP type.

After the UE calculates the sum of the peak values for each CP type, the UE determines whether the maximum value among the sums of the calculated peak values is larger than a preset specific threshold value in step S615. That is, the UE may determine whether the maximum value is valid information for obtaining the information for the CP length by using the preset specific threshold value.

When the maximum value is smaller than the specific threshold value, the UE returns to step S605 to select the target timing again.

On the contrary, when the maximum value is larger than the specific threshold value, the UE stores a CP type corresponding to the maximum value as a temporary CP type in step S620. Here, the temporary CP type means a specific CP type temporarily determined as the UE performs the method (b).

Thereafter, in step S625, the UE obtains the information for the CP type by performing the aforementioned method (a). That is, the UE may obtain the information for the CP length based on the scheme that calculates the peak value for the synchronization signal by using the original subframe and the permuted subframe.

After the UE obtains the information for the CP type through the method (a), the UE determines whether the temporary CP type stored in step S620 and the CP type obtained in step S625 are the same as each other in step S630. That is, the UE determines whether the CP type obtained through the method (a) and the CP type obtained through the method (b) are the same as each other. Therefore, an effect of error correction of acquisition of the CP type of the UE may be acquired, and as a result, information for an accurate CP type may be obtained.

In this case, when the CP type obtained in step S625 is not the same as the temporary CP type stored in step S620, the UE returns to step S605 to select the target timing again.

On the contrary, when the CP type obtained in step S625 is the same as the temporary CP type stored in step S620, the UE determines the corresponding CP type as a final CP type. As a result, the UE may determine the CP type applied to the signal transmitted from the eNB based on the received synchronization signal.

In the case of existing legacy LTE, a method for obtaining the information for the CP length based on a relative location on a time domain between PSS and SSS (or SSS candidate) received from the eNB is used. For example, in the existing legacy LTE in which the synchronization signals are transmitted in the TDM scheme, the UE may determine the CP length (i.e., CP type) between a timing of receiving the PSS and a timing of receiving the SSS. In this case, the UE needs to particularly receive and use both the PSS and the SSS in order to obtain the information for the CP length.

However, when the synchronization signals are transmitted through different frequencies (e.g., in the FDM scheme), respectively (that is, when only a specific synchronization signal is transmitted at a specific frequency), the existing method of using the relative location on the time domain between the synchronization signals may be not be applied in order to obtain the information for the CP length.

In this case, the UE may obtain the information for the CP length used for transmitting the signal through the methods described above in this specification, which use only a specific synchronization signal (e.g., x-PSS, x-SSS, etc.) other than the method of using the relative location.

Further, since the method proposed by the present invention uses only the specific synchronization signal as compared with the method used in the existing legacy LTE, the CP length may be efficiently determined by using only one synchronization signal.

2) Method of Using Sequence of Synchronization Signal Including Information for CP Length Further, in yet another embodiment of the present invention, in order to provide the information for the CP type to the UE, information for the CP length is added to a sequence used for an additional synchronization signal may be considered.

The method as a method in which the permuted subframe is not applied is a method in which the additional synchronization signal is used.

For example, when the additional synchronization signal transfers the information for the CP length by using n bits, n means a positive integer which satisfies that a number available as the CP length is equal to or smaller than 2n.

The UE may obtain the information for the CP length and thereafter, the UE may obtain a master information block (MIB) by decoding the x-PBCH. After the UE obtains the MIB, the UE may receive up to system information (SI) and then, obtain information for a subband in which a service desired by the UE is transmitted. Thereafter, the UE may perform transmission/reception of data by moving to the corresponding subband.

(2) Method for Obtaining Information for CP Type when Two or More CP Types are Used for Signal Transmission The embodiments described above refer to embodiments in which one CP type is used for transmission of all signals in the NR system. However, as mentioned above, a case may also be considered in which in the NR system, a predetermined (or preconfigured) CP length (e.g., a fixed CP length ($CP_f$)) is used for transmission of some predetermined (or preconfigured) signals and another CP length (e.g., $CP_O$) is used for transmission of the remaining signals.

In other words, when the subcarrier spacing is a known value between the UE and the eNB, the eNB may transmit predetermined synchronization signals to the UE using the $CP_f$ and transmit other signals to the UE using the $CP_O$.

In this case, the eNB may transmit the synchronization signal in a different beam direction for each symbol using the analog beamforming. That is, the eNB may transmit the synchronization signal to the UE via a beam set in a different direction for each symbol.

Specifically, for example, a method may be considered in which the eNB transmits the x-PSS, the x-SSS, the ESS, and the x-PBCH using the $CP_f$. That is, a case where the $CP_f$ is applied to a signal related to frequency/time synchronization may be considered. Since the predetermined $CP_f$ is applied, when the UE performs detection and/or decoding for the x-PSS, the x-SSS, the ESS, and the x-PBCH, a problem related to the CP does not occur.

In this case, when the eNB is configured to transmit information related to the CP via the MIB, the UE may obtain the information for the $CP_O$, i.e., the information for the CP type applied to the remaining signals other than the x-PSS, the x-SSS, the ESS, and the x-PBCH via the MIB transmitted in the x-PBCH.

As another example, a method may be considered in which the eNB transmits the x-PSS, the x-SSS, the ESS, the x-PBCH, and a specific X-PDSCH (i.e., x-PDSCH in which a system information block (SIB) is transmitted) by using the $CP_f$. Since the predetermined $CP_f$ is applied, when the UE performs detection and/or decoding for the x-PSS, the x-SSS, the ESS, the x-PBCH, and the specific x-PDSCH (i.e., x-PDSCH in which the SIB is transmitted), the problem related to the CP does not occur.

In this case, when the eNB is configured to transmit the information related to the CP via the SIB, the UE may obtain the information for the $CP_O$, i.e., the information for the CP type applied to the remaining signals other than the x-PSS, the x-SSS, the ESS, the x-PBCH, and a specific x-PDSCH (i.e., x-PDSCH in which the SIB is transmitted) via the SIB transmitted in the x-PDSCH.

In contents described above, a band in which the synchronization signal is transmitted using the default numerology may be referred to as an anchor carrier or an anchor subband. In this case, each default numerology may be defined for each specific frequency band.

The UE may preferentially perform synchronization by detecting the synchronization signal by using the default numerology and thereafter, may move to a subband or carrier corresponding to a desired service. The UE that moves to the subband or carrier tunes to a numerology (e.g., subcarrier spacing) at the corresponding location, performs fine synchronization in the corresponding band, and receives the service.

When the UE moves to a specific service, the eNB may signal to the UE information for a numerology (e.g., the subcarrier spacing, the CP length, etc.) applied to a band corresponding to the specific service via the system information transmitted in the anchor carrier (or anchor subband). The UE that receives the information may receive the service by moving to a desired subband or carrier according to the service desired by the UE and transmit and receive the signal by using the information for the subcarrier spacing and/or the CP length included in the received information. That is, the UE may transmit and receive the signal by tuning to the received subcarrier spacing and/or CP length.

However, when a distance on a frequency between the anchor carrier (or anchor subband) and a subband in which an actual service is desired to be received increases, a separate synchronization procedure may be additionally requested for fine synchronization.

In this case, the eNB may transmit the additional synchronization signal to the corresponding band (i.e., the subband in which the actual service is desired to be received). Alternatively, when the eNB indicates only a subcarrier spacing applied to a specific subband in the anchor carrier (or an anchor subband), the UE may additionally obtain the information for the CP length using the additional synchronization signal in the corresponding band.

Further, a scheme proposed in this specification may be applied to the synchronization signal transmitted in the anchor carrier and may also be applied to a separate synchronization signal (i.e., additional synchronization signal) transmitted in the specific subband.

Figure 7:
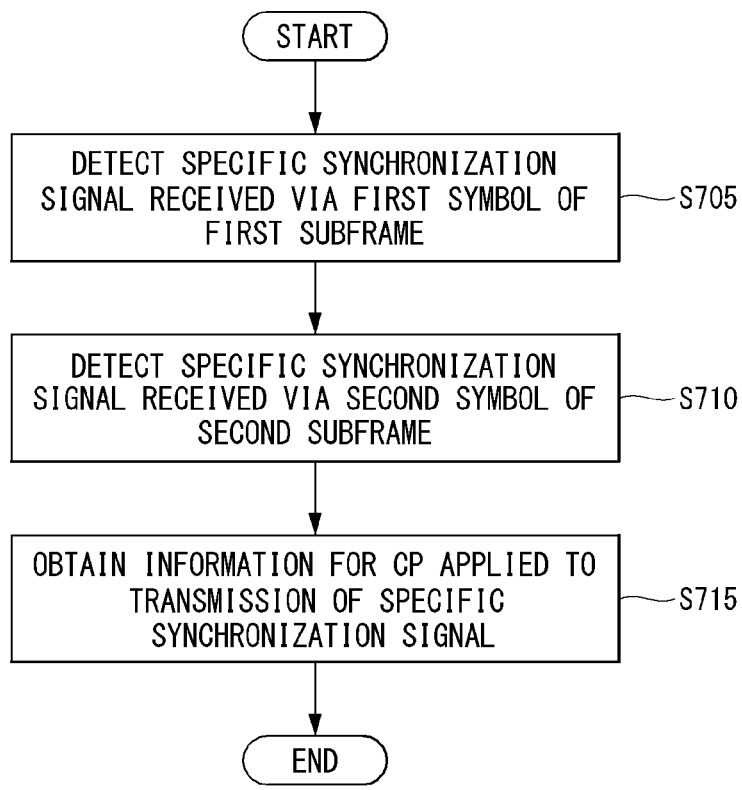
FIG. 7 illustrates an operation flowchart of a UE for obtaining information for a CP type applied to transmission of a signal according to a method proposed by the present invention.

FIG. 7 illustrates an operation flowchart of a UE for obtaining information for CP applied to transmission of a signal according to a method proposed by the present invention. FIG. 7 is just for convenience of the description and does not limit the scope of the present invention.

Referring to FIG. 7, it is assumed that the UE knows the subcarrier spacing used for transmission of the synchronization signal in advance. Further, the UE may perform the operation described in FIG. 7 regardless of the scheme (e.g., FDM scheme or TDM scheme) in which the synchronization signals are transmitted.

In step S705, the UE detects a specific synchronization signal received from the eNB via a first symbol of a first subframe. Here, the specific synchronization signal may be the x-PSS, the x-SSS, the ESS, etc.

Further, the first subframe may mean the original subframe described in FIGS. 4 to 6 above. In addition, the first symbol may mean a specific symbol of the first subframe in which the specific synchronization signal transmitted via the beam which may be viewed by the UE among the beams of the eNB is detected.

In step S710, the UE detects the specific synchronization signal received from the eNB via a second symbol of a second subframe. Here, the second subframe includes a subframe in which the symbol index is permuted according to a preconfigured pattern with respect to the CP applied to the specific synchronization signal.

For example, the second subframe may mean the permuted subframe described in FIGS. 4 to 6 above. In addition, the second symbol may mean the specific symbol of the second subframe in which the specific synchronization signal transmitted via the beam which may be viewed by the UE among the beams of the eNB is detected.

In this case, the specific synchronization signal may be transmitted by using a first beam set in the first subframe and transmitted by using a second beam set in the second subframe. Here, the first beam set may mean a beam set configured by a plurality of beams allocated to a plurality of symbols of the first subframe, respectively and the second beam set configured by a plurality of beams allocated to a plurality of symbols of the second subframe, respectively. In this case, as described above, the first beam set and the second beam set may be configured with respect to different CP types, respectively. In other words, a different beam set may be configured for each CP type.

Further, a beam allocated to the first symbol among the plurality of beams of the first beam seat may be identical to a beam allocated to the second symbol among the plurality of beams of the second beam set. Here, the beam allocated to the first symbol and the beam allocated to the second symbol may include a specific beam in which a signal detected by the UE is transmitted among the plurality of beams of the eNB.

Further, a difference value between a timing when the first subframe is transmitted and a timing when the second subframe is transmitted may be defined as a multiple of a transmission period of the specific synchronization signal. For example, when the specific synchronization signal is the x-PSS, the first subframe and the second subframe are synchronization subframes in which the x-PSS is transmitted, so that a transmission interval between the first subframe and the second subframe may be defined as a multiple of the transmission period ($P_{PSS}$) of the x-PSS.

The UE obtains the specific synchronization signal via the first subframe and the second subframe and thereafter, the UE obtains the information for the CP applied to transmission of the specific synchronization signal. In this case, the UE uses an offset value between the index of the first symbol and the index of the second symbol.

Here, the offset value between the index of the first symbol and the index of the second symbol indicates the CP type corresponding to the CP among one or more CP types supported in the wireless communication system.

The offset value may mean the value of $t_1-t_0$ in FIGS. 4 to 6 described above. That is, the offset value may mean a difference between a time at which the peak value for the specific synchronization signal in the first sub-frame is detected and a time at which the peak value for the specific synchronization signal in the second subframe is detected.

In this case, candidates of the offset value between the index of the first symbol and the index of the second symbol may be preconfigured and the candidates may be mapped for each Cp type. That is, the candidates are mapped to the CP types in a one-to-one relationship.

Further, as illustrated in FIGS. 5 and 6 described above, the UE may detect the specific synchronization signal received from the eNB via a third symbol of the first subframe. In other words, the UE may detect the specific synchronization signal transmitted via two or more beams in the first subframe.

Here, a difference between the third symbol and the first symbol may correspond to a specific CP. For example, the symbol length may be approximately 71.3 us or approximately 83.3 us.

In this case, the UE may calculate the sum of the peak values for the specific synchronization signal detected in the first subframe. When the calculated sum is larger than a preconfigured threshold value, the UE determines the specific CP as the temporary CP and determines whether the temporary CP matches the CP obtained via the offset value in FIG. 7 to finally determine the CP type.

As an error for determination of the CP type is corrected by a two-step scheme, the UE may obtain information for a fine CP type in spite of using only the specific synchronization signal transmitted from the eNB.

General Apparatus to which the Present Invention May be Applied

Figure 8:
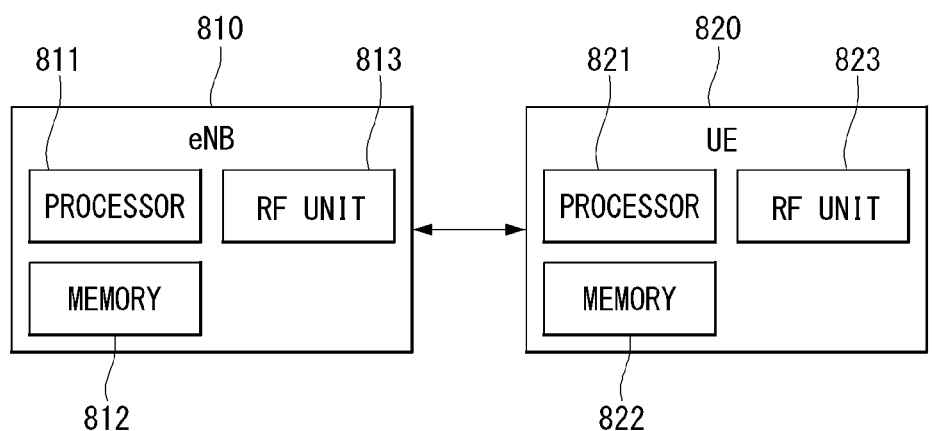
FIG. 8 illustrates a block diagram of a wireless communication device to which methods proposed in the present invention may be applied.

FIG. 8 illustrates a block diagram of a wireless communication apparatus to which the methods proposed in this specification may be applied.

Referring to FIG. 8, a wireless communication system includes an eNB (or base station) 810 and a plurality of UEs 820 disposed within the eNB (810) region.

The eNB 810 includes a processor 811, memory 812 and a radio frequency (RF) unit 813. The processor 811 implements the functions, processes and/or methods proposed in FIGS. 1 to 7. The layers of a radio interface protocol may be implemented by the processor 811. The memory 812 is connected to the processor 811, and stores a variety of types of information for driving the processor 811. The RF unit 813 is connected to the processor 811 and transmits and/or receives radio signals.

The UE 820 includes a processor 821, memory 822 and an RF unit 823.

The processor 821 implements the functions, processes and/or methods proposed in FIGS. 1 to 7. The layers of a radio interface protocol may be implemented by the processor 821. The memory 822 is connected to the processor 821 and stores a variety of types of information for driving the processor 821. The RF unit 823 is connected to the processor 821 and transmits and/or receives radio signals.

The memory 812, 822 may be positioned inside or outside the processor 811, 821 and may be connected to the processor 811, 821 by various well-known means.

For example, in a wireless communication system supporting low latency service, a UE may include a radio frequency (RF) unit for transmitting and receiving radio signals in order to transmit and receive downlink (DL) data and a processor functionally connected to the RF unit.

Furthermore, the eNB 810 and/or the UE 820 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the method for obtaining information for a cyclic prefix (CP) by the UE in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for obtaining information for a cyclic prefix (CP) in a wireless communication system by a terminal, the method comprising:
   detecting a specific synchronization signal received from a base station via a first symbol of a first subframe;
   detecting the specific synchronization signal received from the base station via a second symbol of a second subframe; and
   obtaining information for the CP applied to transmission of the specific synchronization signal, based on an offset value between an index of the first symbol and an index of the second symbol,
   wherein the second subframe includes a subframe in which a symbol index is permuted based on a preconfigured pattern for the CP, and
   wherein the offset value between the index of the first symbol and the index of the second symbol indicates a CP type for the CP among one or more CP types supported in the wireless communication system.

2. The method of claim 1, wherein in the first subframe, the specific synchronization signal is transmitted by using a first beam set configured by a plurality of beams allocated to a plurality of symbols of the first subframe, respectively, and
   in the second subframe, the specific synchronization signal is transmitted by using a second beam set configured by a plurality of beams allocated to a plurality of symbols of the second subframe, respectively, and
   wherein the first beam set and the second beam set are configured for different CP types, respectively.

3. The method of claim 2, wherein a beam allocated to the first symbol among the plurality of beams of the first beam set is identical to a beam allocated to the second symbol among the plurality of beams of the second beam set.

4. The method of claim 3, wherein the beam allocated to the first symbol and the beam allocated to the second symbol include a specific beam in which a signal detected by the terminal is transmitted among the a plurality of beams of the base station.

5. The method of claim 2, wherein the detecting of the specific synchronization signal comprises detecting a peak value among values for the specific value for the specific signal.

6. The method of claim 3, wherein candidates of the offset value between the index of the first symbol and the index of the second symbol are preconfigured between the base station and the terminal, and
   wherein the candidates are mapped for each CP type.

7. The method of claim 2, wherein a difference value between a timing when the first subframe is transmitted and a timing when the second subframe is transmitted is defined as a multiple of a transmission period of the specific synchronization signal.

8. The method of claim 3, wherein the second beam set includes a beam set in which the plurality of beams of the first beam set are permuted based on the preconfigured pattern.

9. The method of claim 1, further comprising:
   receiving, from the base station, a synchronization signal including information-related to the second subframe.

10. The method of claim 1, further comprising:
    detecting the specific synchronization signal received from the base station via a third symbol of the first subframe, wherein a difference between the third symbol and the first symbol corresponds to a symbol length corresponding to a specific CP;
    calculating a sum of a peak value for the specific synchronization signal received via the first symbol and a peak value for the specific synchronization signal received via the third symbol; and
    determining, when the calculated sum is larger than a preconfigured threshold value, whether a temporary CP matches the CP obtained based on the offset value by determining the specific CP as the temporary CP for the specific synchronization signal.

11. A terminal for obtaining information for a cyclic prefix (CP) in a wireless communication system, the terminal comprising:
    a transceiver for transmitting and receiving a radio signal; and
    a processor functionally connected to the transceiver,
    wherein the processor controls to:
    detect a specific synchronization signal received from a base station via a first symbol of a first subframe,
    detect the specific synchronization signal received from the base station via a second symbol of a second subframe, and
    obtain information for the CP applied to transmission of the specific synchronization signal based on an offset value between an index of the first symbol and an index of the second symbol,
    wherein the second subframe includes a subframe in which a symbol index is permuted based on a preconfigured pattern for the CP, and wherein the offset value between the index of the first symbol and the index of the second symbol indicates a CP type for the CP among one or more CP types supported in the wireless communication system.

* * * * *